E. MONTAGUE.
VALVE.
APPLICATION FILED FEB. 28, 1919.

1,345,548.

Patented July 6, 1920.

Witnesses:
W. F. Kilroy
Harry R. L. White

Inventor:
Edward Montague
By Miller Chindahl Parker
Att'ys.

UNITED STATES PATENT OFFICE.

EDWARD MONTAGUE, OF CHICAGO, ILLINOIS.

VALVE.

1,345,548.　　　Specification of Letters Patent.　　Patented July 6, 1920.

Application filed February 28, 1919. Serial No. 279,844.

*To all whom it may concern:*

Be it known that I, EDWARD MONTAGUE, a citizen of the United States, residing at Chicago, in the county of Cook and State of Illinois, have invented certain new and useful Improvements in Valves, of which the following is a specification.

The invention relates to valves for explosive engines, and particularly to valves for such engines as are employed in automobiles, aeroplanes and the like, which operate at high speed. Such valves, as ordinarily constructed, become heated in use to such a degree as to become distorted, corroded or pitted, with the result that they lack durability, fail to seat effectively, and otherwise fail to function properly.

The principal object of the present invention is to provide a valve which shall not become heated to an excessive and injurious temperature while in use in an explosive engine.

A further and incidental object of the invention is to provide a valve of the character indicated which may be manufactured at a relatively low cost, which is durable, and which is otherwise of a practical character.

Figure 1:
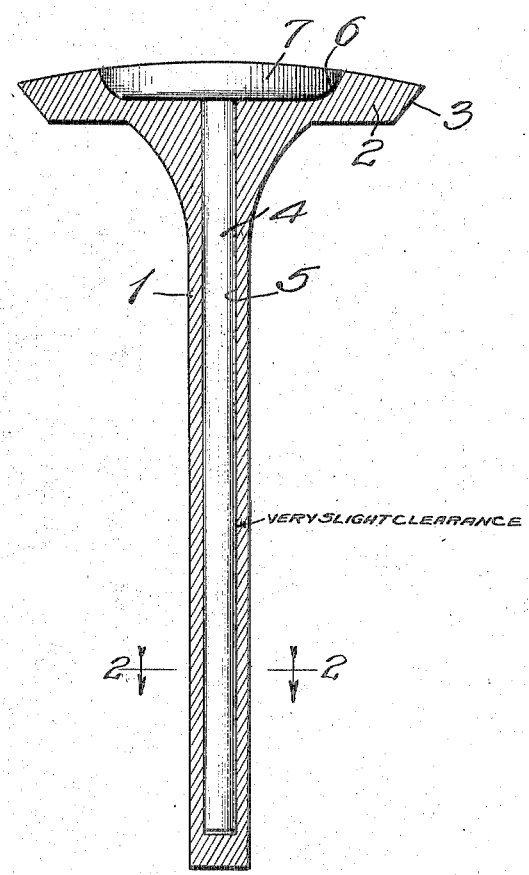
Figure 2:
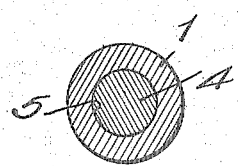

Referring to the accompanying drawings, Figure 1 is a central vertical elevation-section through a valve, illustrating one embodiment of my invention. Fig. 2 is a transverse sectional view taken on line 2—2 of Fig. 1.

The valve may be of any preferred form. Herein it comprises a stem 1 and a disk or head 2 having an annular tapered edge 3 for which a seat is provided in the engine-structure (not shown).

As is usual, the stem 1 and head 2 of the valve are made of steel, but for the purpose of preventing the valve from becoming heated excessively in use I provide in the valve a heat conductor 4 of a different kind of metal adapted to conduct the heat from the valve head to the stem, from which it radiates, being absorbed by the cooling medium surrounding the stem. Preferably a metal of high conductivity, such as copper, is employed for this purpose, and is made in the form of a rod which is inserted into an opening or bore 5 extending longitudinally of the stem 1. Herein such bore is shown as extending from a point near the free end of the stem and terminating in the head 2. To compensate for the unequal expansion of the steel and the metal of the conductor, and thus prevent the stem from expanding unduly, causing it to stick in its guide, the conductor is preferably made a trifle smaller in diameter than the bore so as to have a relatively free fit therein.

Any suitable means for securing the conductor in place within the valve may be employed. Herein I have shown the upper face of the valve head 2 as provided with a cavity 6 and the conductor is provided with an enlarged portion 7 which may be swaged into binding engagement with the head. Being unconfined on its upper side, said portion 7 is capable of expanding without injury to the parts although it has a snug engagement with the head.

It will be understood that the invention is not limited to the particular construction and arrangement set forth, but that various changes may be made within the scope of the invention. The conductor may be of any preferred form, it may be arranged in the valve in any preferred manner, and it may be secured therein in any way that may be deemed desirable.

I claim as my invention:

1. In a valve for explosive engines having a stem and a head, means for conducting heat from the head to the stem comprising a rod of copper or the like having an enlargement on one end, said stem having a bore extending longitudinally thereof into which said rod is entered, and said head having a cavity for receiving said enlargement on the rod, the rod being slightly smaller in size than the bore and the enlargement on the rod fitting snugly in its cavity so as to be firmly secured therein.

2. In a valve for explosive engines having a stem and a head, means for conducting heat from the head to the stem comprising a rod of metal of relatively high conductivity, said stem having a bore extending longitudinally thereof into which said rod is entered, and said rod having an end portion fitting snugly in said head so as to be firmly secured therein but opening into the face of the head so as to be unconfined.

3. In a valve for explosive engines having a stem and a head, means for conducting heat from the head to the stem comprising a rod formed of metal of relatively high conductivity, said stem having an opening extending longitudinally thereof adapted to receive said rod but made of slightly greater cross-section than the rod, said rod having a portion rigid with the valve but with one face exposed.

4. In combination with a valve having a head and a stem, a heat conductor formed of copper or the like adapted to be entered within said stem, and means for anchoring one end of the conductor in the head so as to secure it in position in the stem while permitting relative movement between the conductor and the stem.

5. A device of the character described having, in combinatiton, a metallic part subject to excessive heat in use, a part to which heat may be conducted for radiation, and a third metallic part of higher conductivity than the other two parts and adapted to conduct heat from the first part to the second part, said third part having a part fixed with reference to one of the other two parts, and a part movable with reference to the other one of said two parts.

In testimony whereof I have hereunto set my hand.

EDWARD MONTAGUE.